United States Patent
Duck et al.

(10) Patent No.: US 11,274,978 B2
(45) Date of Patent: Mar. 15, 2022

(54) TAPERED THERMAL PROBE COVER AND CORRESPONDING PACKAGING SYSTEM

(71) Applicant: Medline Industries, Inc, Northfield, IL (US)

(72) Inventors: Benjamin Duck, McHenry, IL (US); Allison Jamison, Chicago, IL (US)

(73) Assignee: Medline Industries LP, Northfield, IL (US)

( * ) Notice: Subject to any disclaimer, the term of this patent is extended or adjusted under 35 U.S.C. 154(b) by 455 days.

(21) Appl. No.: 15/800,927

(22) Filed: Nov. 1, 2017

(65) Prior Publication Data

US 2019/0128742 A1   May 2, 2019

(51) Int. Cl.
*G01K 13/25* (2021.01)
*G01K 13/20* (2021.01)

(52) U.S. Cl.
CPC ............. *G01K 13/25* (2021.01); *G01K 13/20* (2021.01)

(58) Field of Classification Search
CPC ...... G01K 1/083; B65D 5/008; B65D 5/2047; B65D 77/02; B65D 77/04; B65D 77/0446
USPC ..... 229/100, 114, 113, 112, 122.34; D9/431; 206/565, 306
See application file for complete search history.

(56) References Cited

U.S. PATENT DOCUMENTS

| | | |
|---|---|---|
| 1,164,868 A | 12/1915 | Redman |
| 2,625,315 A | 1/1953 | Fehrenkamp |
| 2,670,892 A | 3/1954 | Marron |
| 2,686,002 A * | 8/1954 | Inman .................. B65D 5/3621 229/114 |
| 3,145,905 A | 8/1964 | Arlington |
| 3,752,309 A * | 8/1973 | Hopkins ................ G01K 1/083 206/306 |
| 3,759,370 A * | 9/1973 | Blatz ........................ B65B 9/02 206/306 |
| 4,156,956 A * | 6/1979 | Partridge ............. A61G 17/044 27/4 |
| 4,349,109 A * | 9/1982 | Scordato ................ B01L 9/543 206/486 |
| 4,577,760 A * | 3/1986 | Rainin .................... B01L 9/543 206/508 |
| 4,714,164 A | 12/1987 | Bachner |
| 4,729,672 A * | 3/1988 | Takagi ................... G01K 1/083 206/306 |
| D355,598 S | 2/1995 | Aronhalt |
| 5,441,702 A * | 8/1995 | Lemieux ................ B01L 9/543 206/499 |
| D433,942 S | 11/2000 | Persson et al. |
| D438,463 S | 3/2001 | Schill et al. |

(Continued)

OTHER PUBLICATIONS

"Color Trapezoid Bags", Published Nov. 12, 2017; Retrieved Aug. 29, 2917 from http://www.swatler.com/online-store/bags/paper-shopping-bags/euroshoppers/color-trapezoid.

(Continued)

*Primary Examiner* — Christopher R Demeree
(74) *Attorney, Agent, or Firm* — Philip H. Burrus, IV

(57) ABSTRACT

A system includes a container (500) having a base member (506) and four sides (501,502,503,504). The four sides flare outward from the base member as the four sides extend distally from the base member. The four sides define an open top (506) of the container. One or more tapered probe covers (100) can be stored within the container. The container can have a protective covering (700) as well.

20 Claims, 6 Drawing Sheets

(56) References Cited

U.S. PATENT DOCUMENTS

| | | | |
|---|---|---|---|
| D456,710 S | 5/2002 | Persson | |
| D469,687 S | 2/2003 | Larien | |
| D564,794 S | 3/2008 | Ehresman | |
| 7,572,066 B2 | 8/2009 | Lane et al. | |
| D633,787 S | 3/2011 | Vinseiro | |
| 8,479,972 B2 | 7/2013 | Craft et al. | |
| D769,114 S | 10/2016 | Montemayor et al. | |
| 2010/0147720 A1* | 6/2010 | Li | G01J 5/02 206/438 |
| 2012/0292378 A1* | 11/2012 | Smith | B65D 25/108 229/114 |

OTHER PUBLICATIONS

"Trapezoid Templatemaker", Published Jul. 17, 2016; Retrieved Aug. 28, 2018 from https://www.templatemaker.nl/index.php?template=trapezoid&lang=en.

Koenig, Vy N., "Ex Parte Quayle Action", U.S. Appl. No. 29/624,512; filed Nov. 1, 2017; dated Oct. 12, 2018.

* cited by examiner

TAPERED THERMAL PROBE COVER AND CORRESPONDING PACKAGING SYSTEM

BACKGROUND

Technical Field

This disclosure relates generally to medical devices, and more particularly to medical device covers and corresponding packaging.

Background Art

Medical professionals use temperature measurement devices to assess the health or condition of a patient. While once limited to glass tubes filled with mercury or other temperature dependent volumetric fluid, most temperature measurement devices today are electronic. These devices generally include a long, slender probe that has a temperature measurement device, such as a thermistor or thermocouple, disposed along its length or at its tip. The probe can be inserted into an orifice of a patient to measure the patient's body temperature.

Since these devices are expensive, and are therefore not disposable, covers are often applied over the probe so that the temperature measurement device can be used on multiple patients. The application and removal of a cover is frequently more convenient than having to fully sterilize the device between uses. Such covers are generally plastic and are disposable.

Prior art probe covers suffer from a number of issues. First, they can tear when inserted on the probe. Second, even when they do not tear, they may have to stretch or deform, which can compromise reliability. It would be advantageous to have an improved probe and corresponding packaging system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
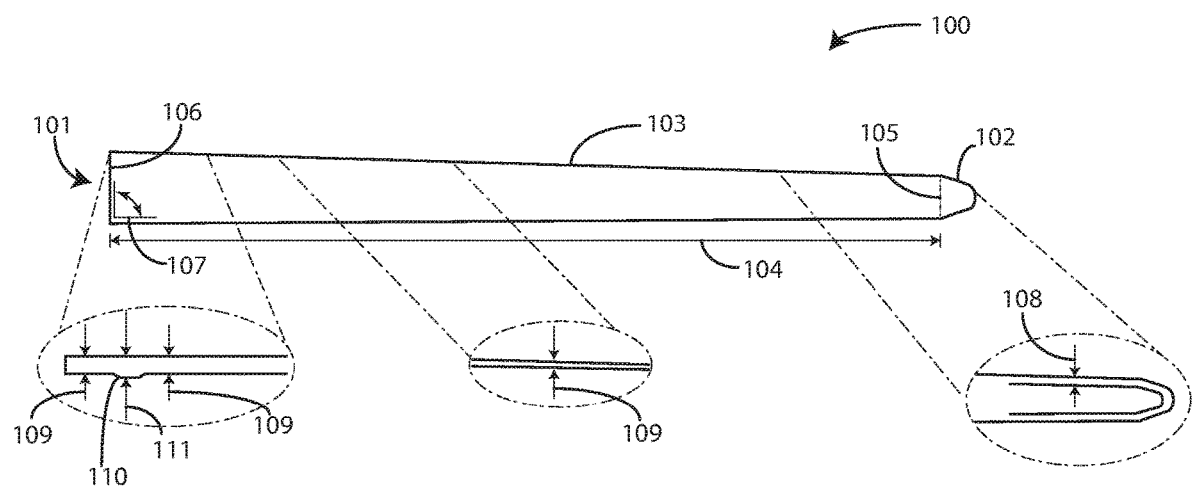
FIG. 1 illustrates one explanatory tapered probe cover in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. As used herein, components may be "operatively coupled" when information can be sent between such components, even though there may be one or more intermediate or intervening components between, or along the connection path. The terms "substantially" and "about" are used to refer to dimensions, orientations, or alignments inclusive of manufacturing tolerances. Thus, a "substantially orthogonal" angle with a manufacturing tolerance of plus or minus two degrees would include all angles between 88 and 92, inclusive. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide a container accommodating one or more tapered probe covers. In one or more embodiments, the container comprises a base member and four sides that flare outwardly from the base member as they extend distally from the base member. The four sides define an open top of the container. A plurality of tapered probe covers can be situated within the container.

The container can optionally include a protective covering that spans and covers the open top of the container. This protective covering can define an opening. The protective veering can also include a closure. In one or more embodiments, the closure biases the opening to a closed position. A probe can be inserted through the opening to attach a tapered probe cover to the probe, which can then be withdrawn through the same opening.

Advantageously, embodiments of the disclosure provide a packaging solution for tapered probe covers where one end of the probe cover is wider than the other. Additionally, a tapered packaging system allows the tapered probe covers to stand vertically within a predefined "holster" space of 50 millimeters by 20 millimeters. In one or more embodiments, the tapered packaging system allows up to 25 tapered probe covers to fit within this space without toppling, spilling, or being deformed.

Figure 8:
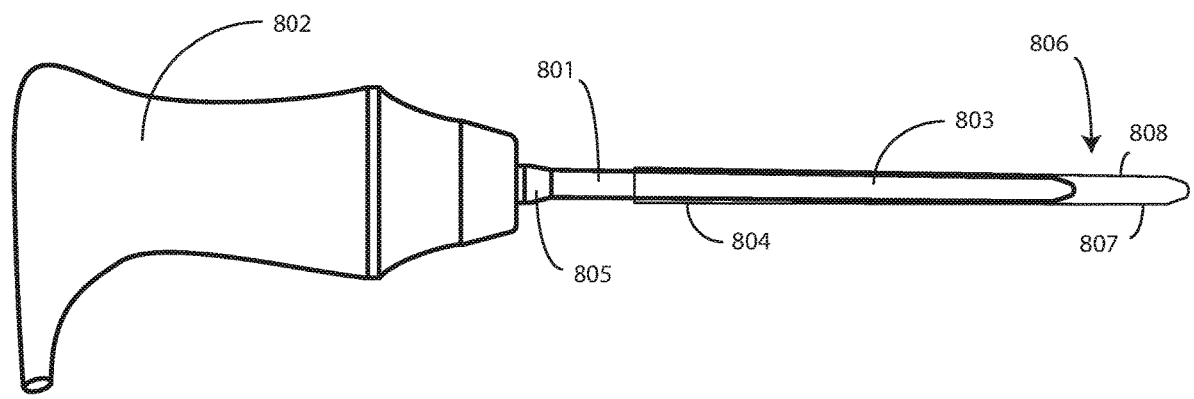
FIG. 8 illustrates a prior art temperature measurement device and prior art probe cover.

In one or more embodiments, the packaging system can include a protective film layer with an optional closure mechanism. The closure mechanism can be an elastic band, spring device, or zip strip system. The protective film layer works to protect the probe covers disposed within the packaging system from contamination. At the same time, in one or more embodiments the closure mechanism allows a probe—or a user's fingers—to be inserted within the protective film layer so that a tapered probe cover can be withdrawn therefrom. Advantageously, the inclusion of the protective film layer allows vertical access to the packaging system so that tapered probe covers can be withdrawn Turning now to FIG. 8, illustrated therein is a prior art temperature measurement device 800. The temperature measurement device 800 includes a probe 801 and a housing 802. The probe 801 can be manufactured from stainless steel. The probe 801 can include a temperature-sensing device, such as a thermistor or thermocouple. The temperature-sensing device can be disposed in a tip 803 of the probe 801. Alternatively, the temperature-sensing device can be disposed in the shaft 804 of the probe 801. Electrical circuits used to measure temperature may be disposed within the housing 802. Batteries or other energy storage devices may also be stowed within the housing 802.

The shaft 804 of the probe 801 is substantially cylindrical, and extends from a frustoconical base 805 to the tip 803. The shaft 804 of the probe 801 is sized so as to be insertable into the orifice of a person. The housing 802 serves as a handle for the temperature measurement device 800 and can include one or more buttons or other control devices that facilitate operation of the temperature measurement device 800. The control devices can also provide ejection of probe covers. Ejection mechanisms can cause probe covers to be ejected from the temperature measurement device by, for example, causing the shaft 804 of the probe to translate outwardly from the frustoconical base 805 away from the housing 802, thereby pushing a probe cover off of the probe 801.

Figure 9:
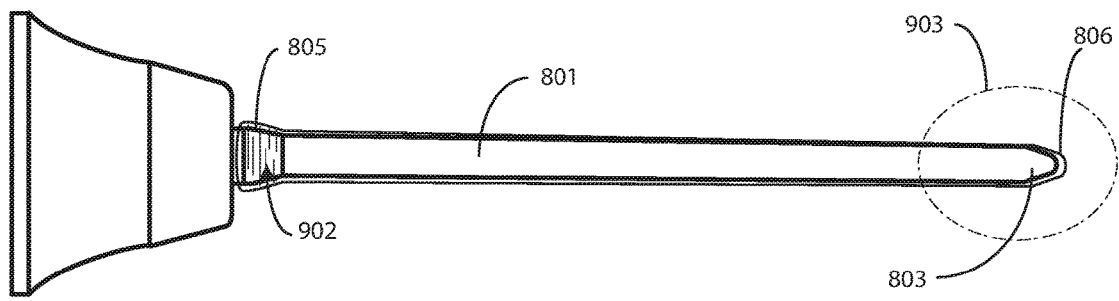
FIG. 9 illustrates a prior art probe and probe cover.

As shown in FIG. 8, a prior art probe cover 806 is being applied to the exterior of the probe 801. This prior art probe cover 806 consists of a hollow elongated member with parallel sides 807,808. As shown in FIG. 9, due to the fact that the prior art probe cover 806 has parallel sides 807,808, its open end 901 must stretch 902 and expand to pass over the frustoconical base 805. While this stretching 902 and expansion retains the prior art probe cover 806 to the frustoconical base 805, it is problematic in that it can cause the prior art probe cover 806 to tear and split. This can subject the probe 801 to contamination from germs and bacteria.

The material used for the prior art probe cover 806 is generally a low-density plastic, such as polypropylene. The prior art probe cover 806 can be manufactured by a fusion molding process, injection-molding process, or other process. The diameter of the prior art probe cover 806 is slightly larger than the diameter of the probe 801. Each has parallel sides. This allows the prior art probe cover 806 to slide along the length of the probe 801 with very little space therebetween.

In some embodiments, the prior art probe cover 806 has a substantially constant thickness across its length. For example, the wall thickness of the prior art probe cover 806 can be substantially constant along its length, which is about four inches in this illustrative embodiment.

In other embodiments, the tip end 903 of the prior art probe cover 806 has a wall thickness that is thinner than that of the major axial portion of the prior art probe cover 806. Illustrating by example, the major axial portion of the prior art probe cover 806 may have a wall thickness of approximately 0.022-0.028 inches between the open end 901 and the tip end 903, while the tip end 903 may have a wall thickness of about 0.010-0.016 inches. For instance, one prior art probe cover 806 has an interior wall thickness between the open end 901 and the tip end 903 of about 0.025 inches, while the tip end 903 may have a wall thickness of about 0.010 inches. This thinner tip end 903 can be problematic in that the tip 803 of the probe 801 can sometimes pierce the tip end 903, thereby subjecting the probe 801 to contamination from germs and bacteria.

Advantageously, embodiments of the disclosure overcome the problems of the open end 901 rupturing about the frustoconical base 805 and/or the tip end 903 rupturing due to its thinner thickness. Embodiments of the disclosure accomplish this by providing a tapered probe cover that tapers linearly from its open end to its tip end. The tapering prevents the need for the open end to stretch 902 and deform about the frustoconical base 805.

Additionally, rather than having a thinner tip end, some embodiments of the disclosure have a thicker tip end. Other embodiments have a thinner tip end. Where included, the thicker tip end can prevent inadvertent rupture of the tip end from the tip 803 of the probe 810. Turning now to FIG. 1, illustrated therein is one such tapered probe cover 100.

The tapered probe cover 100 of FIG. 1 comprises a hollow, tapering, elongated member that tapers from a wider open end 101 to a narrower distal tip 102. In this illustrative embodiment, the wider open end 101 is about 0.25 inches in diameter, while the narrower distal tip 102 is defined by the diameter of the probe upon which the tapered probe cover 100 will be placed. In one or more embodiments, the narrower distal tip 102 has a diameter of about 0.20 inches. These measurements are examples only, as other measurements will be obvious to those of ordinary skill in the art having the benefit of this disclosure.

As shown in FIG. 1, the sidewalls 103 of the tapering probe cover 100 taper as the tapering probe cover 100 extends from the wider open end 101 to the narrower distal tip 102. In this illustrative embodiment, the sidewalls 103 taper in a linear fashion, such that the sidewalls 103 define a frustoconical cross-sectional shape along a length 104 of the tapering probe cover 100 that is disposed between the wider open end 101 and the narrower distal tip 102. In this illustrative embodiment, the sidewalls 103 taper linearly along a length 104 of the tapering probe cover 100 that is disposed between the wider open end 101 and the narrower distal tip 102 due to the fact that the sidewalls 103 are straight. For example, in one or more embodiments, the sidewalls 103 extend distally from the base 106 of the wider open end 101 at an acute angle 107. In one or more embodiments, this acute angle 107 is between 89.1 degrees and 89.5 degrees. In one embodiment, this acute angle 107 is about 89.3 degrees.

In one or more embodiments, the tapering probe cover 100 is manufactured from polyethylene. In one or more embodiments, the narrower distal tip 102 has a wall thickness 108 that is thicker than is the wall thickness 109 extending along a length 104 of the tapering probe cover 100 that is disposed between the wider open end 101 and the narrower distal tip 102. In other embodiments, the narrower distal tip 102 has a wall thickness 108 that is thinner than is the wall thickness 109 extending along a length 104 of the tapering probe cover 100 that is disposed between the wider open end 101 and the narrower distal tip 102.

Illustrating by example, in one or more embodiments the wall thickness 109 extending along a length 104 of the tapering probe cover 100 that is disposed between the wider open end 101 and the narrower distal tip 102 is between 0.17 and 0.20 inches, while the wall thickness 108 of the distal tip is between 0.24 and 0.30 inches. In other embodiments, the wall thickness 109 extending along a length 104 of the tapering probe cover 100 that is disposed between the wider open end 101 and the narrower distal tip 102 is between 0.17 and 0.20 inches, while the wall thickness 108 of the distal tip is between 0.12 and 0.15 inches.

Where the narrower distal tip 102 has a wall thickness 108 that is thicker than is the wall thickness 109 extending along a length 104 of the tapering probe cover 100 that is disposed between the wider open end 101 and the narrower distal tip 102, this thicker wall thickness 108 of the narrower distal tip 102 can advantageously prevent the tip (803) of a probe (801) from piercing the narrower distal tip 102. This works to prevent the probe (801) from contamination by germs and bacteria. Additionally, thicker wall thickness 108 of the narrower distal tip 102 advantageously helps to retain the tapering probe cover 100 securely to the probe (801) of a temperature measurement device (800), as well as increasing the thermal coupling of a patient's flesh to the tip (803) of the probe where the temperature-sensing device is typically located.

In one or more embodiments, the wall thickness 109 extending along a length 104 of the tapering probe cover 100 that is disposed between the wider open end 101 and the narrower distal tip 102 has a consistent thickness. In most embodiments, this is true with one exception. In one or more embodiments, the wall thickness 109 is consistent along a length 104 of the tapering probe cover 100 that is disposed between the wider open end 101 and the narrower distal tip 102 except where the sidewalls 103 define a protrusion 110. In one or more embodiments, the thickness 111 of this protrusion 110 is greater than is the wall thickness 109 of the sidewalls. However, as shown in FIG. 1, where the protrusion is included the wall thickness 109 of the sidewalls 103 on either side of the protrusion 110 is the same. For example, the wall thickness 109 on the sidewalls 103 to either side of the protrusion can be about 0.53 millimeters, while the thickness 111 of the protrusion 110 is about 0.61 millimeters.

Figure 2:
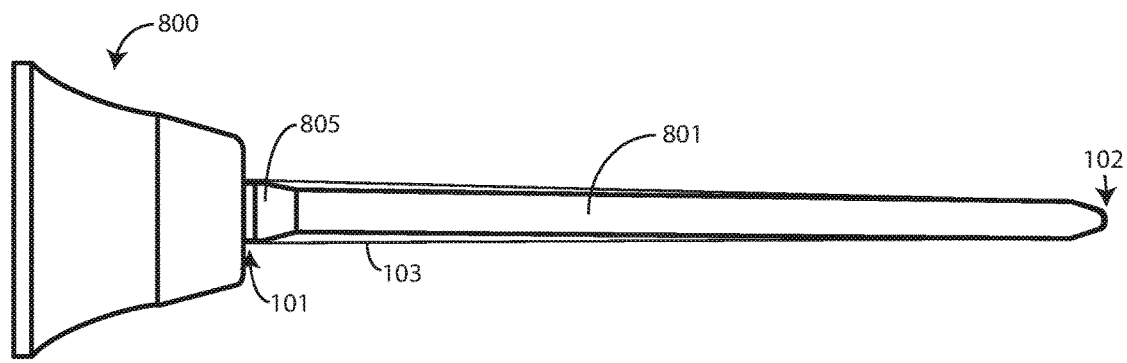
FIG. 2 illustrates one explanatory tapered probe cover after being applied to a probe in accordance with one or more embodiments of the disclosure.

Turning now to FIG. 2, illustrated therein is the tapering probe cover 100 being applied to the probe 801 of the prior art temperature measurement device 800 of FIG. 8. Advantageously, since the sidewalls 103 taper linearly along a length (104) of the tapering probe cover 100 that is disposed between the wider open end 101 and the narrower distal tip 102, the open end is retained securely to the frustoconical base 805 with no stretching or deformation required. This improved fit at the frustoconical base 805, combined with the improved fit at the narrower distal tip 102 due to the thicker wall thickness (108) allows the tapered probe cover to be securely retained to the probe 801 with no stretching or deformation.

Accordingly, the tapering probe cover 100 of FIGS. 1 and 2 overcomes the problems associated with prior art designs, including a open end (901) that ruptures about the frustoconical base 805 and/or the tip end (903) that is pierced due to its thinner thickness. Embodiments of the disclosure accomplish this by providing a tapered probe cover that tapers linearly from its open end to its tip end. Additionally, rather than having a thinner tip end, embodiments of the disclosure have a thicker tip end.

Figure 3:
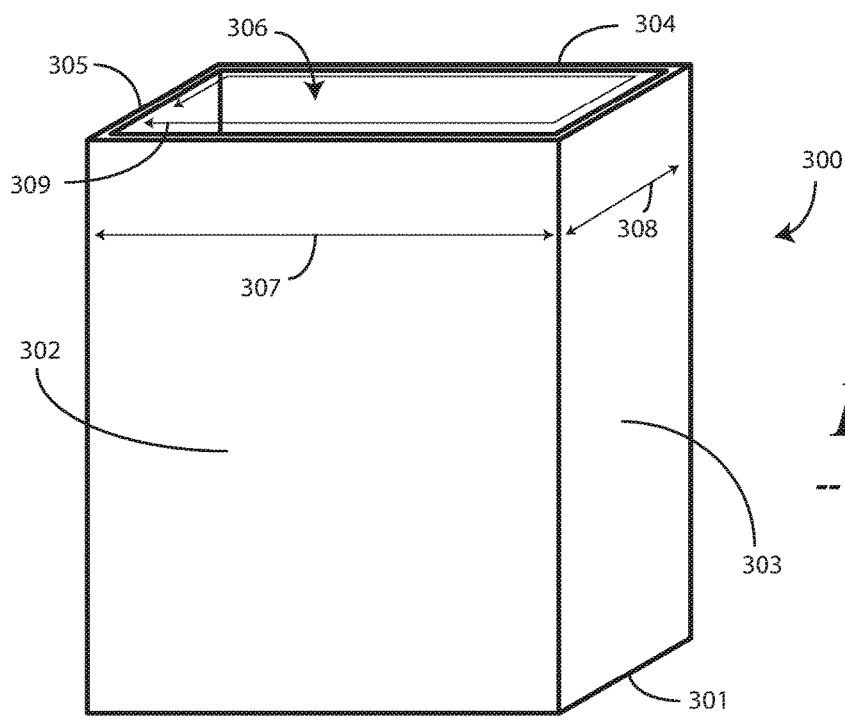
FIG. 3 illustrates a prior art probe cover holster.

Embodiments of the disclosure contemplate that medical services providers may have already invested capital and money into the prior art temperature measurement device 800 before discovering the wonderful invention set forth in the present disclosure. Accordingly, they may have also invested time into accessories used with the prior art temperature measurement device 800 as well. Turning now to FIG. 3 illustrated therein is one such accessory device.

The accessory device of FIG. 3 is that of a prior art metal "holster" 300 designed to hold one or more of the prior art probe covers (806). Recall from above that prior art probe covers (806) consist of a hollow elongated member with parallel sides (807,808). Since the prior art probe cover (806) includes parallel sides (807,808), the prior art metal holster 300 designed to hold the prior art probe covers (806) consists of a flat base 301 with four vertical sides 302,303, 304,305. Here, the prior art metal holster 300 is a substantially rectangular container with four vertical sides 302,303, 304,305 extending from the base 301 to an open end 306. Prior art probe covers (806) with parallel sides (807,808) are simply inserted into the open end 306 and are retained there until needed for use.

The four vertical sides 302,303,304,305 define an opening at the open end 306 that has a X-dimension 307 and a Y-dimension 308. The X-dimension 307 and the Y-dimension 308 define a perimeter 309 of the open end 306 that has a predefined measurement. In one or more embodiments, the X-dimension is between 47 and 57 millimeters. In one embodiment, the Y-dimension is between 18 and 20 millimeters. Accordingly, the predefined measurement of the perimeter 309 can be between 130 and 154 millimeters.

Figure 4:
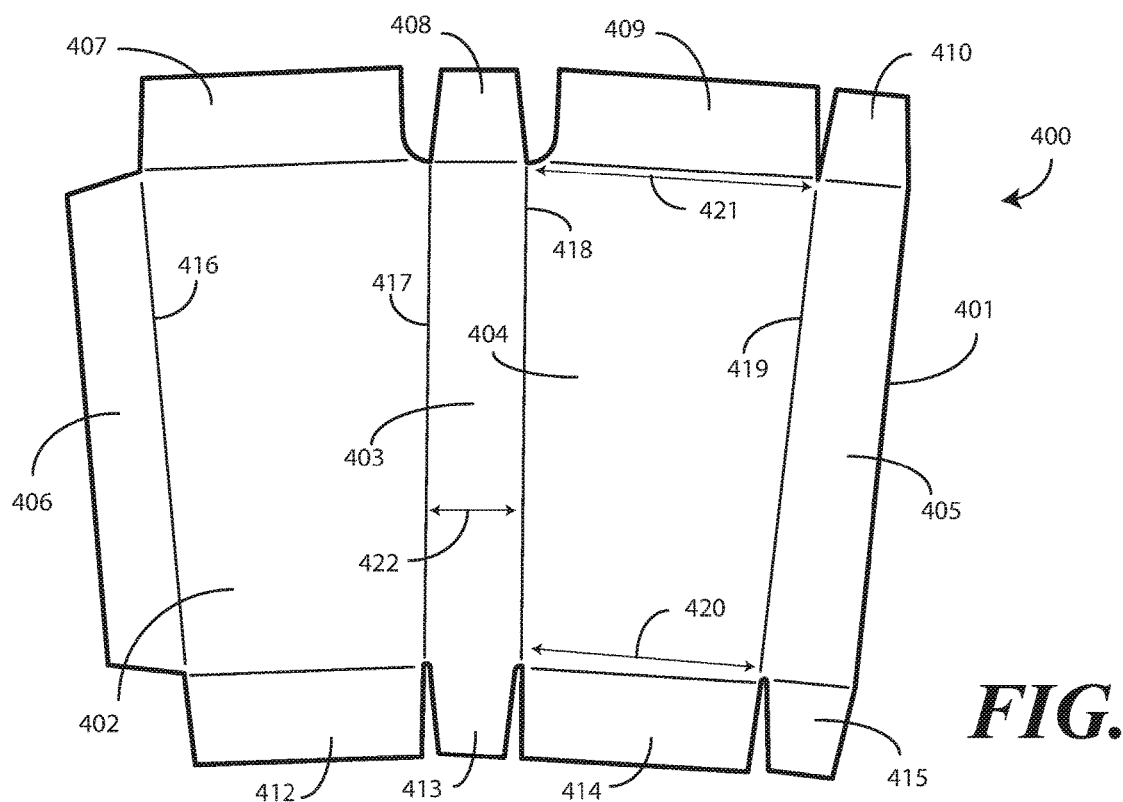
FIG. 4 illustrates a blank for one explanatory packaging system suitable for one or more probe covers, each configured in accordance with one or more embodiments of the disclosure.

Embodiments of the present disclosure contemplate that many users will be attracted to the benefits of the tapering probe cover (100) described herein, namely, the fact that the tapering probe cover (100) overcomes the problems of the open end (901) of the prior art probe covers (806) rupturing about the frustoconical base (805) of the prior art temperature measurement device (800) and/or the tip end (903) rupturing due to its thinner thickness. However, embodiments of the disclosure contemplate that a user may not wish to dispose of the fancy prior art metal holster 300 in which they have invested capital, space, and funds. Advantageously, embodiments of the disclosure provide a solution to this predicament by providing a probe cover packaging system that both retains tapering probe covers (100) upright and without deformation, and that sits nicely within the prior art metal holster 300. Turning now to FIG. 4, illustrated therein is one blank 400 suitable for constructing a probe cover package suitable for use in a probe covering packaging system configured in accordance with one or more embodiments of the disclosure.

As shown in FIG. 4, the blank 400 includes a foldable panel arrangement 401 with four side panels 402,403,404, 405 and a side linking panel 406. When the four side panels 402,403,404,405 are folded about the vertical fold lines 416,417,418,419, the side linking panel 406 can be glued or otherwise bonded to side panel 405.

Four reinforcing panels 407,408,409,410 extend distally from the top edges of the four side panels 402,403,404,405. When the four side panels 402,403,404,405 are folded about the vertical fold lines 416,417,418,419, and the side linking panel 406 is glued or otherwise bonded to side panel 405 to create the package, each of the four reinforcing panels 407,408,409,410 can be folded down and glued or otherwise affixed to the inner sides of the four side panels 402,403, 404,405 to provide reinforcement for the upper end of the container. For example, reinforcing panel 407 can be glued or otherwise affixed to the inner side of side panel 402, while reinforcing panel 408 can be glued or otherwise affixed to the inner side of side panel 403. Similarly, reinforcing panel 409 can be glued or otherwise affixed to the inner side of side panel 404, while reinforcing panel 410 can be glued or otherwise affixed to the inner side of side panel 405.

Two base panels 412,414 and two bottom linking panels 413,415 extend from the four side panels 402,403,404,405.

When the four side panels 402,403,404,405 are folded about the vertical fold lines 416,417,418,419, and the side linking panel 406 is glued or otherwise bonded to side panel 405 to create the package, the two base panels 412,414 can be glued or otherwise affixed to each other to define a bottom side of the package. The two bottom linking panels 413.415 can be glued or otherwise affixed to the interior surfaces of one or both of the two base panels 412,414 to reinforce the bottom of the package.

The blank 400 can be manufactured out of a variety of materials. In one embodiment, the blank 400 is cut from cardboard or thick paper. In another embodiment, the blank 400 is cut from chipboard. In another embodiment, the blank 400 is cut from a thin layer of thermo plastic material. Other materials suitable for manufacture of the blank 400 will be obvious to those of ordinary skill in the art having the benefit of this disclosure.

In one or more embodiments, two of the four side panels 402,403,404,405 taper along their length as they extend from the two base panels 412,414 and two bottom linking panels 413,415. In this illustrative embodiment, side panels 402 and 404 taper along their length as they extend from the two base panels 412,414, while side panels 403,405 stay the same width along their length, i.e., are substantially rectangular.

For example, in one embodiment side panels 402,404 taper along their length, i.e., get wider, as they extend from the two base panels 412,414 from a bottom width 420 of between 47 and 48 millimeters to an upper width 421 of between 56 and 57 millimeters. Meanwhile, the substantially constant width 422 of side panels 403,405 is between 18 and 19 millimeters. In one embodiment, the bottom width 420 of side panels 402,404 is about 47.0276 millimeters, while the top width 421 of side panels 402,404 is about 56.9124 millimeters. In one embodiment, width 422 of side panels 403,405 is about 18.9763 millimeters.

Figure 5:
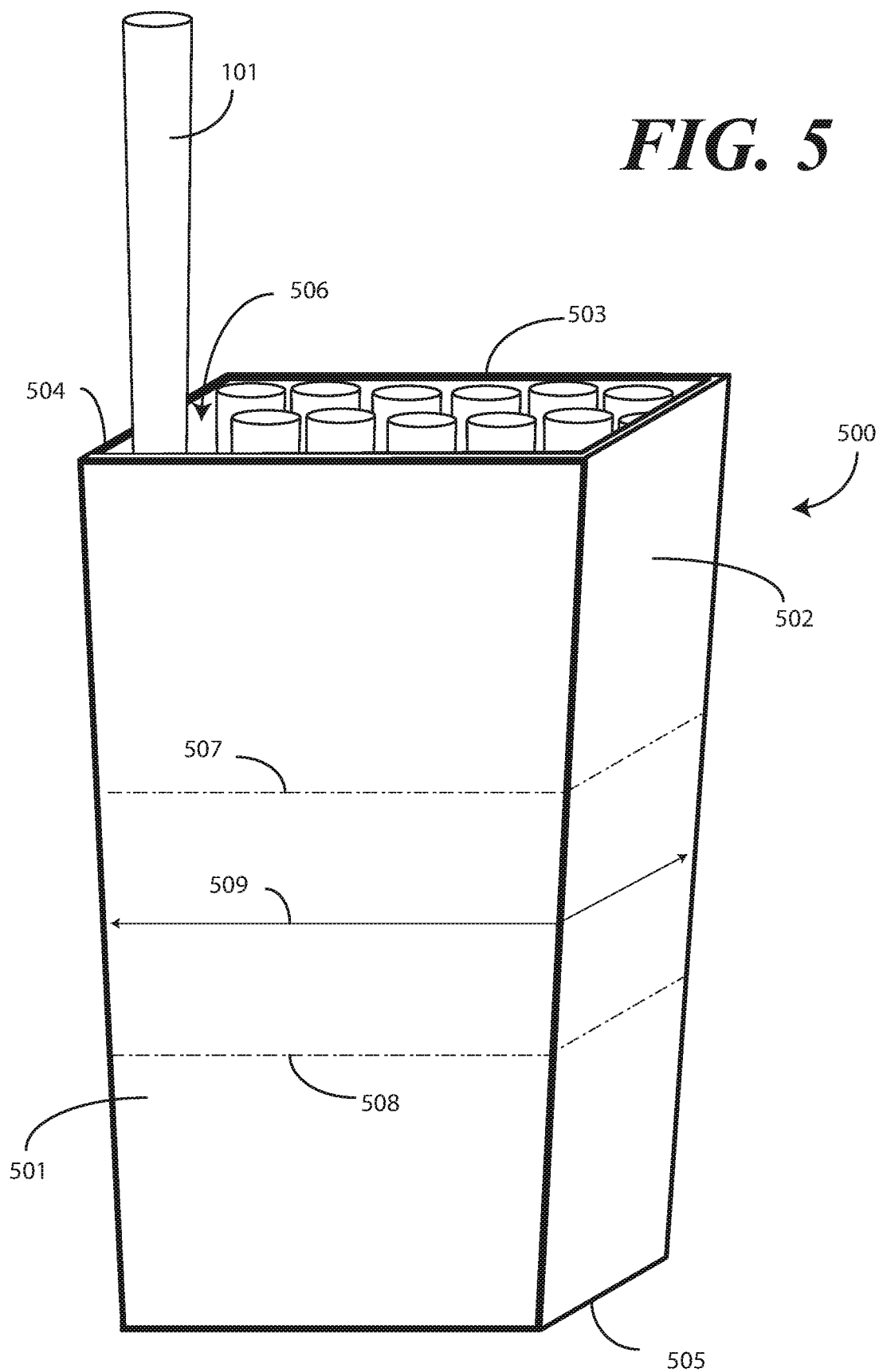
FIG. 5 illustrates one explanatory probe cover packaging system in accordance with one or more embodiments of the disclosure.

In other embodiments, all four side panels 402,403,404, 405 taper along their lengths, i.e., get wider from bottom to top, as they extend from the two base panels 412,414 and two bottom linking panels 413,415. Still other embodiments will be obvious to those of ordinary skill in the art having the benefit of this disclosure Turning now to FIG. 5, illustrated therein is a container 500 manufactured as described above with reference to FIG. 4 using the blank (400). As shown, the container 500 includes four sides 501,502,503,504 that flare outward as they extend from a base 505 to an open top 506. That sides 502,504 flare outwardly as the four sides 501,502,503,504 extend from the base 505 to the open top 506 occurs due to the fact that sides 501,503 taper as they extend from the base 505 to the open top 506. However, these sides 504,504 would also flare if they tapered along their lengths, as do sides 501,503. The fact that the four sides 501,502,503,504 flare outward as they extend from the base 505 to the open top 506 allows one or more tapering probe covers 100 to be inserted into the container 500. The container thus resembles an inverse pyramid with the tip cut off at base 505.

In one or more embodiments, the container 500 defines a waist 508 that has a belt perimeter measurement 509 that fits within a predefined range. Since the four sides 501,502,503, 504 flare outward as they extend from the base 505, the belt perimeter measurement 509 will be largest at the top of the waist 508 and smallest at the bottom of the waist 508. In one or more embodiments, the boundaries of the waist are defined by a maximum and minimum belt perimeter measurement 509. In one or more embodiments, the maximum belt perimeter measurement 509 is about 55 millimeters, while the minimum belt perimeter measurement 509 is about 50 millimeters.

Accordingly, in one or more embodiments the belt perimeter measurement 509 is less than a maximum predefined measurement for the perimeter (309) of the prior art holster (300), while at the same time being less than a minimum predefined measurement for the perimeter (309) of the prior art holster (300). This allows the container 500 to nest within the prior art holster (300) as shown in FIG. 6.

Figure 6:
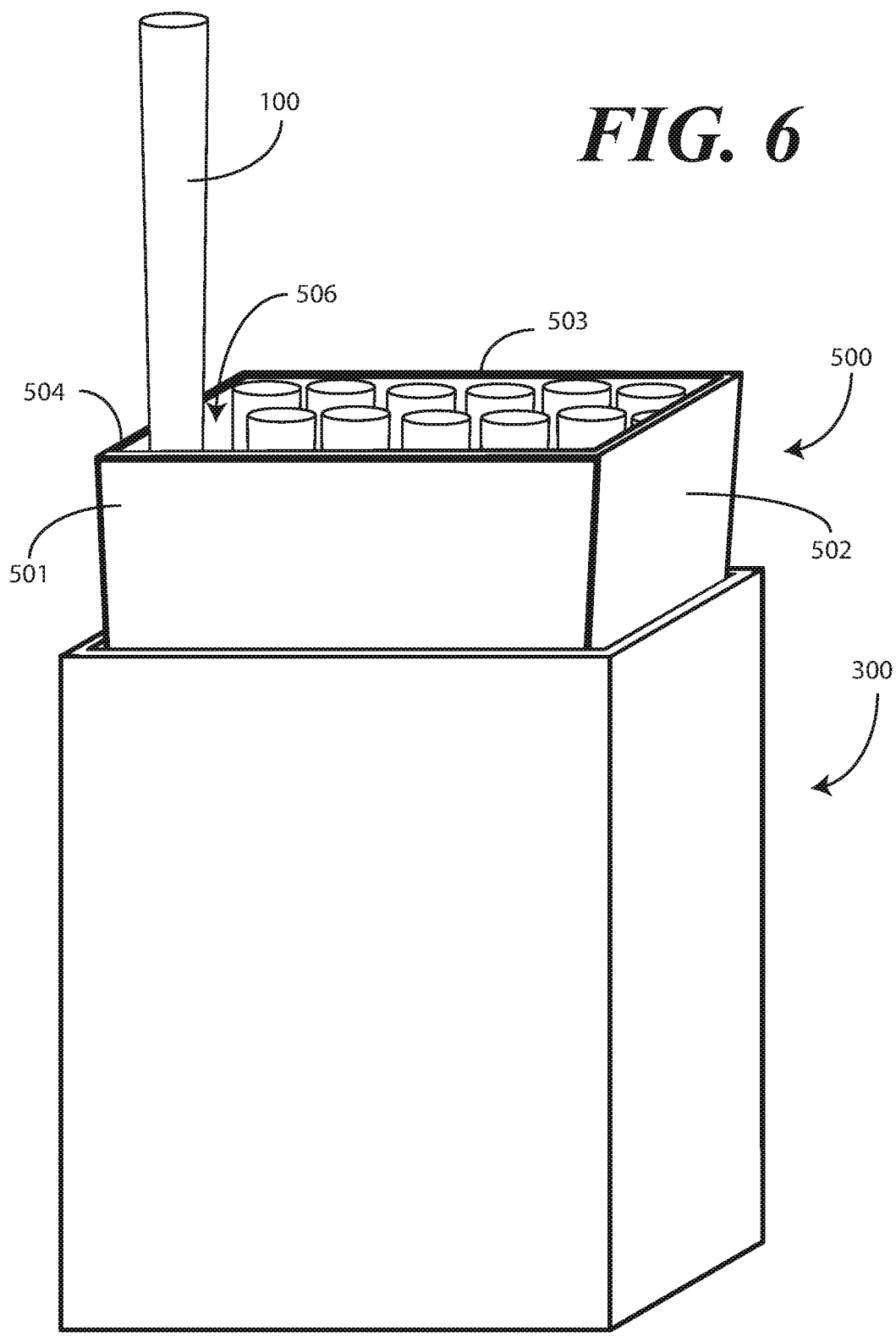
FIG. 6 illustrates one explanatory probe cover packaging system in accordance with one or more embodiments of the disclosure.

Turning now to FIG. 6, the container 500, which is holding a plurality of tapered probe covers 100, is nested within the prior art holster 300 from FIG. 3. In one or more embodiments, the container 500 is configured to accommodate 25 tapered probe covers 100. Note that less are shown in FIG. 6 for illustrative purposes so that the details of each tapered probe cover 100 can more readily be seen.

In one or more embodiments, the open top 506 of the container 500 has a perimeter dimension that is greater than the dimension of the perimeter (309) of the prior art holster 300. However, at the same time, in one or more embodiments the base (505) of the container 500 has a perimeter dimension that is less than the dimension of the perimeter (309) of the prior art holster 300. This "bigger at the top but smaller at the bottom" construction, which is a result of the four sides 501,502,503,504 flaring from the base (505), allows the container 500 to securely nest within the prior art holster 300.

Figure 7:
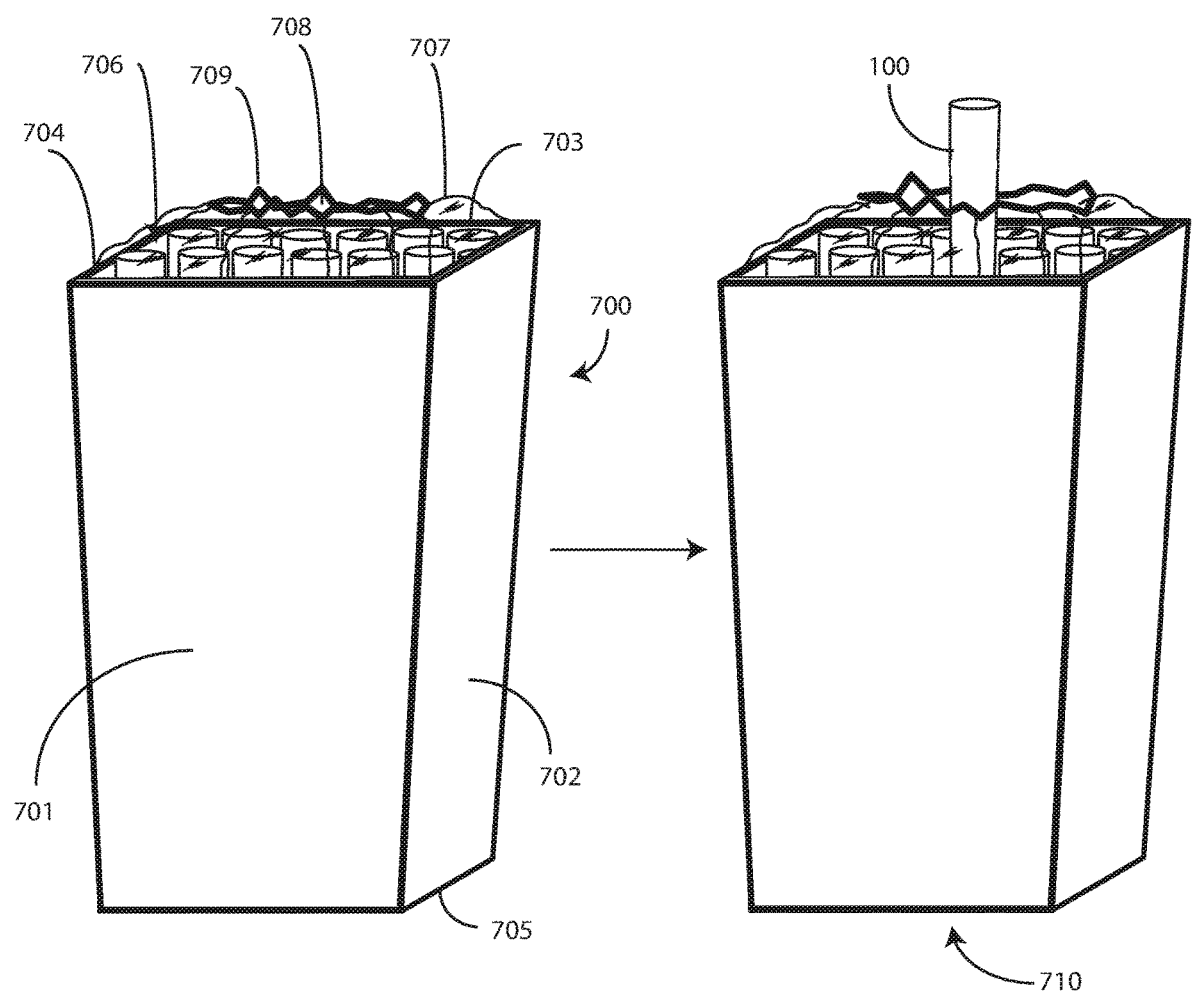
FIG. 7 illustrates another explanatory probe cover packaging system, in addition to one or more method steps for using the probe cover packaging system, each in accordance with one or more embodiments of the disclosure.

While the system shown in FIG. 6 is an ideal way to store one or more tapered probe covers 100 in accordance with embodiments of the disclosure, it is contemplated that the exposed tapered probe covers 100 can come into contact with germs or pathogens when stored thusly in certain contaminated environments. Turning now to FIG. 7, illustrated therein is a solution to this issue.

Illustrated in FIG. 7 is a container 700 that is again manufactured as described above with reference to FIG. 4, e.g., using a blank. As shown, the container 700 includes four sides 701,702,703,704 that flare outward as they extend from a base 705 to an open top 706. The fact that the four sides 701,702,703,704 flare outward as they extend from the base 705 to the open top 706 allows one or more tapering probe covers 100 to be inserted into the container 700. The container again resembles an inverse pyramid with the tip cut off at base 705.

Rather than the open top 706 being exposed to the environment, as was the case in FIG. 6, in this embodiment a protective covering 707 spans and covers the open top 706 to prevent contaminants, germs, microbes, or other materials from contacting the tapered probe covers 100 disposed within the container 700. In one embodiment, the protective covering 707 is manufactured from a clear plastic material, such as a clear pliable plastic film layer. Other materials suitable for manufacturing the protective covering 707 will be obvious to those of ordinary skill in the art having the benefit of this disclosure.

The protective covering 707 can be configured in different ways. In one embodiment, the protective covering 707 is configured as a liner that fully surrounds each of the tapered probe covers 100 situated within the container 700. For example, the protective covering can be configured as a bag into which the tapered probe covers 100 are placed, with the bag then being situated in the container. The sides of the bag may optionally be attached to the inner surfaces of the four sides 701,702,703,704 to retain the bag within the container 700.

In another embodiment, the protective covering 707 is configured as a lid that is coupled to the perimeter of the open top 706, and that spans and covers the open top 706 to cover the tapered probe covers 100 disposed within the container 700. For example, the protective covering 700 can be thermally, adhesively, or otherwise bonded to the perimeter of the open top 706, or alternatively to the inner surfaces of the four sides 701,702,703,704 of the container so as to span and cover the open top 706 to prevent contaminants from contacting the tapered probe covers 100 situated within the container 700. Other techniques for constructing the protective covering 707 will be obvious to those of ordinary skill in the art having the benefit of this disclosure.

In one or more embodiments, the protective covering 707 defines an opening 708. The presence of the opening 708 allows one or more tapered probe covers 100 to be withdrawn from the container 700 through the opening 708 without tearing or otherwise disturbing the protective covering 707.

In one or more embodiments a closure 709 is disposed about the opening 708. In one or more embodiments, the closure 709 is pliable and is biased to keep the opening 708 closed. For instance, in one embodiment the closure 709 comprises an elastomeric member that biases the opening 708 to the closed position. The elastomeric member may be an elastic strip that is disposed about the perimeter of the opening 708 that biases the opening 708 to the closed position by contraction. However, a user can cause the elastomeric member to expand and stretch, thereby causing the opening 708 to open, so that a tapered probe cover 100 to be withdrawn as shown at step 710.

Other elements can be used instead of elastomeric members for the closure 709. Illustrating by example, in another embodiment a zip strip can be used to retain the opening 708 in the closed position. A user can then pull apart the zip strip to open the opening 708, thereby allowing access to a tapered probe cover 100. Similarly, two plastic or metal cantilever beams can be placed at sides of the opening 708 that bias the same toward the closed position. A user can then deflect the plastic or metal cantilever beams away from each other to open the opening 708, thereby allowing access to a tapered probe cover 100. Other types of devices suitable for use as the closure 709 will be obvious to those of ordinary skill in the art having the benefit of this disclosure.

It is noted that using an elastomeric member, such as an elastic strip, as the closure 709 offers distinct advantages. This is true because an elastomeric member allows the tapered probe cover 100 to be withdrawn in multiple ways. For instance, a user can pull the elastomeric member apart to withdraw a tapered probe cover 100 with their fingers. However, in other embodiments, to maintain sterility, a user may prefer to insert a probe (801) into the container 700 to attach a tapered probe cover 100 without the use of their hands. Since an elastomeric member is easily separable, a user may simply push the probe (801) through the opening 708 between the sides of the elastomeric member to attach the tapered probe cover 100 to the probe (801). The probe (801) can then be withdrawn from the container 700 through the opening 708 with the tapered probe cover 100 attached.

Accordingly, embodiments of the disclosure provide a solution for tubular shaped probe covers that have a tapered body. This tapered body causes one end to have a wider diameter. Packages configured in accordance with embodiments of the disclosure advantageously have a wider open end and a narrower base, and therefore fit within prior art containers having vertical sides. Containers configured in accordance with embodiments of the disclosure allow tapered probe covers to situate within a prior art container having an opening perimeter of between 130 and 154 millimeters in one or more embodiments.

Moreover, embodiments of the disclosure can further protect, using protective coverings, the tapered probe covers from contamination when the packages are in use. Openings in the protective coverings allow vertical access of probes—or alternatively fingers—that penetrate a closure to engage a tapered probe cover for withdrawal "hands free."

As shown and described, in one or more embodiments a container with flaring sides allows its base to fit within the opening of a prior art container despite the container's open side being wider than the opening of the prior art container. The sides of the container flare so as to be wide enough to enclose the wider distal end of the tapered probe cover.

Additionally, in one or more embodiments the container includes a protective layer, such as a protective film layer, that covers the open end of the container to prevent contaminants and other things from contacting the tapered probe covers. An integrated closure at the top of the protective layer can allow a probe or fingers to penetrate the opening to attach to a tapered probe cover.

The tapered probe cover that tapers linearly from its open end to its tip end offers numerous advantages. The tapering prevents the need for the open end to stretch and deform about the frustoconical base of a temperature measurement device. In one or more embodiments, rather than having a thinner tip end, the tapered probe cover comprises a thicker tip end. The thicker tip end prevents inadvertent rupture of the tip end from the distal tip of the probe, while maintaining optimal thermal conductivity through the tapered probe cover.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A device, comprising
   a container, comprising:
      a base member; and
      sides extending from the base member;
      the sides consisting essentially of four sides; and
      the four sides flaring outward from the base member as the four sides extend distally from the base member;
      wherein the four sides define an open top of the container; and
   a plurality of tapered probe covers disposed within the container;
   wherein the container is manufactured from a blank comprising four side panels and a side linking panel.

2. The device of claim 1, wherein the side linking panel is attached to one panel of the four side panels.

3. The device of claim 1, wherein the blank further comprises four reinforcing panels extending distally away from top edges of the four side panels.

4. The device of claim 1, wherein a first two sides of the four sides taper along a length of the first two sides.

5. The device of claim 4, wherein a second two sides of the four sides are substantially rectangular.

6. The device of claim 5, wherein the first two sides taper a bottom width of between 47 and 48 millimeters to an upper width of between 56 and 57 millimeters.

7. The device of claim 6, wherein the second two sides have a width of between 18 and 19 millimeters.

8. The device of claim 1, wherein each tapered probe cover comprises a hollow, tapering, elongated member that tapers from a wider open end to a narrower distal tip.

9. The device of claim 8, wherein sidewalls of the each tapered probe cover taper in linearly such that the sidewalls define a frustoconical cross-sectional shape along a length of the tapering probe cover that is disposed between the wider open end and the narrower distal tip.

10. The device of claim 8, wherein the narrower distal tip has a wall thickness that is thinner than is another wall thickness extending along a length of the tapering probe cover that is disposed between the wider open end and the narrower distal tip.

11. The device of claim 1, the container further comprising a protective covering that spans and covers the open top.

12. The device of claim 11, the protective covering defining an opening.

13. The device of claim 12, the protective covering further comprising a closure.

14. The device of claim 13, the closure biasing the opening to a closed position.

15. The device of claim 14, the closure comprising an elastomeric member.

16. The device of claim 1, the blank defining a foldable panel arrangement.

17. The device of claim 1, the blank manufactured from cardboard.

18. The device of claim 1, the blank manufactured from a thermoplastic material.

19. The device of claim 1, wherein sidewalls of the each tapered probe cover change in thickness as they extend from a wider open end to a narrower distal tip.

20. The device of claim 1, further comprising a holster configured to hold the container.

* * * * *